US009837922B2

(12) United States Patent
Lüscher et al.

(10) Patent No.: US 9,837,922 B2
(45) Date of Patent: Dec. 5, 2017

(54) DISCHARGING DC LINK CAPACITORS IN AN NPC CONVERTER

(71) Applicant: ABB Technology Oy, Helsinki (FI)

(72) Inventors: Matthias Lüscher, Gontenschwil (CH); Juerg Rauchenstein, Lachen (CH); Christian Stulz, Zürich (CH)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 15/337,918

(22) Filed: Oct. 28, 2016

(65) Prior Publication Data

US 2017/0047856 A1    Feb. 16, 2017

Related U.S. Application Data

(63) Continuation of application No. PCT/EP2015/057820, filed on Apr. 10, 2015.

(30) Foreign Application Priority Data

Apr. 29, 2014    (EP) .................................... 14166419

(51) Int. Cl.
*H02M 5/458* (2006.01)
*H02M 5/42* (2006.01)
(Continued)

(52) U.S. Cl.
CPC ............... *H02M 5/42* (2013.01); *H02M 1/32* (2013.01); *H02M 5/4585* (2013.01); *H02M 7/487* (2013.01); *H02M 2001/322* (2013.01)

(58) Field of Classification Search
CPC ......... H02M 1/084; H02M 5/45; H02M 5/458
(Continued)

(56) References Cited

U.S. PATENT DOCUMENTS

2005/0231171 A1    10/2005    Kato et al.
2013/0329471 A1*    12/2013    Escobar ................. H02M 7/42
                                                        363/40
(Continued)

FOREIGN PATENT DOCUMENTS

DE    4235138 A1    4/1994
EP    2541746 A2    1/2013
(Continued)

OTHER PUBLICATIONS

European Patent Office, International Search Report & Written Opinion issued in corresponding Application No. PCT/EP2015/057820, dated Aug. 20, 2015, 10 pp.
(Continued)

*Primary Examiner* — Jeffrey Sterrett
(74) *Attorney, Agent, or Firm* — Taft Stettinius & Hollister LLP

(57) ABSTRACT

A method is disclosed in one embodiment for discharging DC link capacitors. In one form the method includes switching a first half bridge of a first converter unit to a positive state, in which its AC output is connected with its positive DC output, and simultaneously switching a second half bridge of a second converter unit to a negative state, in which its AC output is connected with its negative DC output, such that a DC link capacitor of the first converter unit and a DC link capacitor of the second converter unit are interconnected oppositely to each other and discharged via the electrical filter.

20 Claims, 6 Drawing Sheets

(51) Int. Cl.
*H02M 1/32* (2007.01)
*H02M 7/487* (2007.01)

(58) Field of Classification Search
USPC .......................... 363/34, 37, 65, 95, 96, 98
See application file for complete search history.

(56) References Cited

U.S. PATENT DOCUMENTS

2014/0293667 A1* 10/2014 Schroeder ............. H02M 7/483
  363/60
2017/0047856 A1* 2/2017 Luscher .................. H02M 1/32

FOREIGN PATENT DOCUMENTS

| EP | 2541746 A3 | 3/2015 |
|----|------------|--------|
| JP | 2009017750 A | 1/2009 |

OTHER PUBLICATIONS

European Patent Office, Extended Search Report issued in corresponding Application No. 14166419.3, dated Jan. 27, 2015, 6 pp.

* cited by examiner

DISCHARGING DC LINK CAPACITORS IN AN NPC CONVERTER

FIELD OF THE INVENTION

The invention relates to a method and controller for discharging DC link capacitors of an electrical converter.

BACKGROUND OF THE INVENTION

Some types of AC-AC frequency converters may comprise a plurality of neutral point clamped converter units. These converter units may be connected in parallel for providing the phases of the converter and/or in series for increasing the output voltage and the number of voltage levels of a phase.

Examples for such converters may be found in CN 202197222 U and in WO2006/000111 A1.

Each converter unit of the converter may have a DC link with a DC (Direct Current) capacitor to accumulate energy, which is used for producing the output voltage through switching states of an inverter interconnecting the DC link with the respective phase output. Due to reasons of security, the DC capacitors usually have to be discharged during maintenance or when the converter is stopped.

One possible discharging method is done via a high voltage relay and an arrangement of discharging resistors. However, this method requires additional hardware elements, which may increase production and maintenance costs of the converter.

Some other methods for different converter topologies are presented in WO2012/013245 A1 and US2008/0278117 A1.

EP 2 541 746 A2 shows that a DC link capacitor may be discharged into a grid, which may be interconnected via chokes with a converter. In EP 2 541 746 A2 an NPC converter is mentioned.

US 2005/0231171 A1, JP 2009 017750 A and DE 42 35 138 A1 show two-level converters with a DC link capacitor that may be discharged into filters or a load.

DESCRIPTION OF THE INVENTION

The objective of the invention is to reduce costs for an electrical converter.

This objective is achieved by the subject-matter of the independent claims. Further exemplary embodiments are evident from the dependent claims and the following description.

A first aspect of the invention relates to a method for discharging DC link capacitors of an electrical converter. The electrical converter may be an AC-AC converter which interconnects an electrical grid with an electrical machine or a further grid. The converter may be a power or medium voltage converter, i.e. may be adapted for switching voltages of more than 1.000 V and/or currents of more than 100 A.

According to an embodiment of the invention, the converter comprises at least two converter units. Each converter unit comprises a neutral point clamped half-bridge with a neutral point, an AC output, a positive DC output and a negative DC output and each converter unit comprises a DC link with at least two DC link capacitors, which are interconnecting the positive DC output and the negative DC output with the neutral point.

The converter units may be connected in parallel for providing more than one output phase. In this case, the converter may comprise three converter units for generating a three-phase voltage. Alternatively or additionally, the converter units may be connected in series.

According to an embodiment of the invention, the half-bridges of the converter units are interconnected via its neutral points via a first connection and via its AC outputs via a second connection and at least one of the first connection and the second connection comprises an electrical filter. For example, parallel connected converter units may comprise half-bridges directly interconnected via a common link with their AC outputs and/or series connected converter units may comprise half-bridges directly interconnected via a series-connection with their AC outputs. It has to be understood that a direct connection may comprise no further elements such as capacitors, inductors or resistors.

Furthermore, half-bridges may be interconnected via a neutral point filter with their neutral point and/or via an EMC filter with their AC outputs.

According to an embodiment of the invention, the method comprises: switching a first half-bridge of a first converter unit to a positive state, in which its AC output is connected with its positive DC output, and simultaneously switching a second half-bridge of a second converter unit to a negative state, in which its AC output is connected with its negative DC output, such that a DC link capacitor of the first converter unit and a DC link capacitor of the second converter unit are interconnected oppositely to each other and discharged via the electrical filter.

In other words, two half-bridges that are interconnected via a direct connection and a connection via an electrical filter are switched in such a way that a current loop is generated that discharges two DC link capacitors via the electrical filter, which usually comprises a resistor that may be used for dissipating electrical energy.

The method may be implemented in a controller already present in the converter and thus may reduce product costs, since other discharging hardware (such as additional resistors, high voltage relays, FO-converters and supervision) may be omitted. The method only may use main components of the converter, that anyway may be present for the main function of the converter, such as to control the speed and/or torque in the electrical machine by applying different voltages.

According to an embodiment of the invention, the electrical filter comprises a filter resistor and a filter capacitor connected in series. Usually, the electrical filter may comprise a branch for each phase and every filter branch may comprise a resistor and capacitor connected in series.

According to an embodiment of the invention, the method further comprises: switching the first half-bridge and the second half-bridge simultaneously into a neutral state, in which their AC output is connected with the neutral point, such that the filter capacitor, which was charged by the DC link capacitors, while the first and second half bridges were in the positive and negative state, discharges the DC link capacitors. After the half-bridges have been switched in two opposite states, they may be switched in the neutral state.

According to an embodiment of the invention, the method further comprises: switching the first half-bridge to a negative state and simultaneously switching a second or a third half bridge to a positive state, such that a second DC link capacitor of the first half-bridge and a second DC link capacitor of the second or third half-bridge are interconnected oppositely to each other and discharged via the electrical filter. After switching two half bridges into a first opposite state (first one positive state, second one negative state) and/or switching the two half-bridges into the neutral state, the two half-bridges may be switched into a second opposite state (first one negative state, second one positive state). In such a way, the other ones of the DC link capacitors of the corresponding DC links may be discharged.

For example, the half-bridges may be switched vice versa, repeatedly. The discharging may be done by changing the switching states of the switches in a way that the voltage of the capacitors is applied alternately into the electrical filter.

According to an embodiment of the invention, the method further comprises: repeating an alternating switching of the half-bridges for discharging DC link capacitors until the voltage of the DC link capacitors reaches a predefined value. The above described method steps may be applied in a repeated manner to the converter units, such that their DC link capacitors discharge simultaneously and equally. When a predefined value such as for example 0 V, is reached, the discharging by switching may be stopped.

According to an embodiment of the invention, the method further comprises: short circuiting the DC link capacitors, when the voltage has reached the predefined value. For example in the case, when the predefined value is not 0 V, for example more than 100 V, the DC link capacitors may be fully discharged by short-circuiting them by switching the half-bridges accordingly.

According to an embodiment of the invention, each of the converter units comprises a common half-bridge and a phase half-bridge connected in parallel to the DC link. Thus, each of the converter units may comprise a neutral point clamped inverter composed of the two half-bridges.

As already discussed, the converter units may be connected in parallel and may provide different phases of the electrical converter. In this case, the converter units may be star-connected via a common connection or common link interconnecting the AC outputs of the common half-bridges. The common connection or common link may be used for discharging DC link capacitors via the neutral point filter and/or EMC filter.

According to an embodiment of the invention, the converter units are star-connected via a neutral point filter connected to the neutral points of the converter units and the DC link capacitors are discharged via the neutral point filter.

As a possibility, the neutral point filter of the converter may be used to discharge the DC links and the common half-bridges may be switching as explained above and in the following. This may charge the filter capacitor of the neutral point filter branches of both converter units and may discharge the DC link capacitors. After that both switched converter units may be switched back to neutral state, discharging the filter capacitors again. The energy is dissipated in the filter resistors.

According to an embodiment of the invention, the DC link capacitors are discharged by switching the common half-bridges of the converter units. The phase half-bridges are in an open state, in which the respective phase output of the converter unit is disconnected from the phase half-bridge. As said above, during the discharging time through the neutral point filter, no voltage may be fed to the electrical machine, when the phase half-bridge is in a disconnected state. For example, to avoid that voltage is fed to the electrical machine, all semiconductor switches of the phase half-bridge may be switched off, i.e. the phase half-bridge may be in the disconnected state.

According to an embodiment of the invention, the converter units are star-connected via an EMC filter connected to phase outputs of the converter units. The DC link capacitors are discharged via the EMC filter. As a further alternative or additionally, the EMC filter connected to the output phases may be used for DC link discharging. Instead of discharging with the neutral point filter, the same method may be used with the EMC filter. Common and phase stack may be switched, resulting in a faster discharge. However, this means that voltage may be applied to the electrical machine.

According to an embodiment of the invention, three converter units are connected in parallel for providing three phase outputs of the electrical converter. For feeding a three phase electrical machine or grid, three converter units may be used. In this case, the converter units may be switched in a cyclic way to equally and simultaneously discharge all DC link capacitors.

According to an embodiment of the invention, the method further comprises: simultaneously switching a first half-bridge of a first converter unit to the positive state and a second half-bridge of a second converter unit to the negative state; simultaneously switching the second half-bridge to the positive state and a third half-bridge of a third converter unit to the negative state; and simultaneously switching the first half-bridge to the negative state and the third half-bridge to the positive state. The switching method may comprise three switching phases in which all six of the DC link capacitors of the three possible pairs of converter units are discharged.

According to an embodiment of the invention, a first converter unit and a second converter unit are connected in series such that a phase half-bridge of the first converter unit is connected via its AC output with the AC output of a common half-bridge of the second converter unit. It may also be possible that one phase branch of the converter comprises two converter units connected in series for each phase. For example, the first converter unit may also comprise a rectifier. The neutral point of the first converter and the neutral point of the second converter may be interconnected via a neutral point filter. For example, the converter may comprise three pairs of series connected converter units and therefore the neutral point filter may comprise six star-connected branches.

In this case, two series connected converter units may be discharged via the neutral point filter.

According to an embodiment of the invention, the method further comprises: simultaneously switching the phase half-bridge of the first converter unit to the positive state and the common half-bridge of the second converter unit to the negative state; simultaneously switching the phase half-bridge of the first converter unit to the negative state and the common half-bridge of the second converter unit to the positive state. In such a way, a current loop is formed between the two converter units and two branches of the neutral point filter.

For series connected, an analogous method as for the parallel connected converter unit may be used. However, the switching is not done between two phases but between a basic and an extended converter unit.

With this method only one phase may be switched. The other phases may be switched simultaneously or shifted. The common half-bridge of the extended converter unit may be switched inverted in phase with respect to the phase half-bridge of the basic converter unit. The edges of switching may be simultaneous.

According to an embodiment of the invention, the method further comprises: simultaneously switching the half-bridges to the neutral state every time after switching the half-bridges to a positive state or a negative state. In such a way, the filter capacitors charged by the DC link capacitors during the previous step may additionally discharge the DC link capacitors.

According to an embodiment of the invention, each of the half-bridges comprises two upper semiconductor switches connecting the positive DC output with the AC output, two lower semiconductor switches connecting the AC output with the negative DC output and two diodes interconnecting the neutral point with midpoints between the two upper semiconductor switches and two lower semiconductor switches.

According to an embodiment of the invention, the converter is an AC-AC converter and each converter unit furthermore comprises a rectifier for providing its DC link with a DC voltage.

According to an embodiment of the invention, the converter comprises a transformer with multiple secondary windings which are interconnected with the rectifiers of the converter units.

A further aspect of the invention relates to a controller for an electrical converter, which is adapted for performing the steps of the method of one of the preceding claims. The controller also may be used for other control functions, such as generating the desired out frequency by switching the semiconductor switches of the converter units accordingly and such as fault detection.

It has to be understood that features of the method as described in the above and in the following may be features of the controller as described in the above and in the following and vice versa.

The method may be implemented in the controller via software, for example a computer program running on a CPU of the controller. However, the method also may be implemented at least partially in hardware, such as an FPGA.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
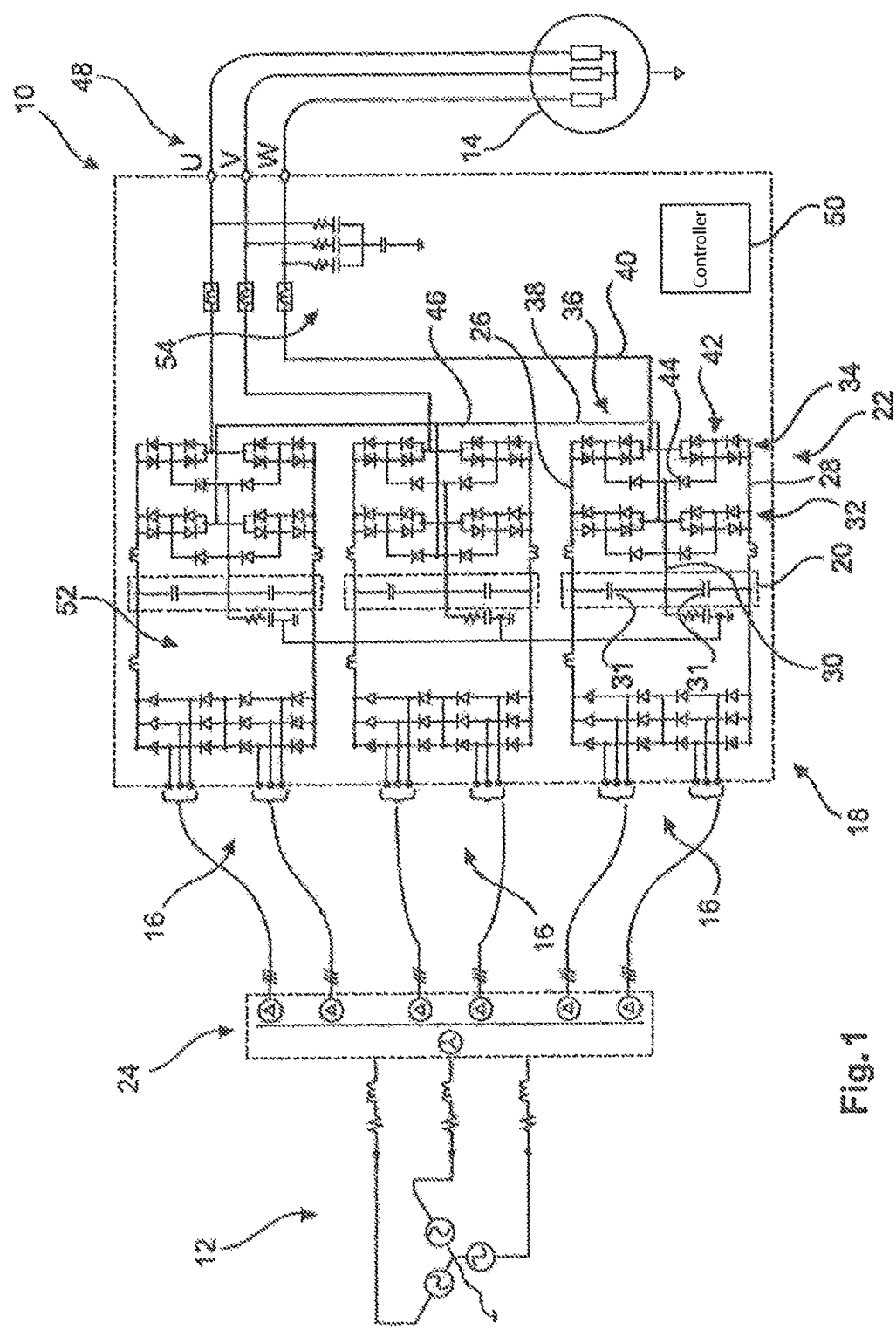
FIG. 1 schematically shows an AC-AC converter with a controller according to an embodiment of the invention.

FIG. 1 shows an AC-AC converter 10 connected between an electrical grid 12 and an electrical machine 14, such as a generator or motor. The grid 12, the converter 10 and the machine 14 each comprises three phases U, V, W.

For each phase, the AC-AC converter 10 comprises a converter unit 16, which comprises a rectifier 18, a DC link 20 and a neutral point clamped inverter 22. The passive rectifiers 18 are connected to secondary windings of a transformer 24, which is connected via its primary windings with the grid 12. Each of the rectifiers 18 provides a DC voltage to the respective DC link 20, which is connected via a positive DC output 26, a negative DC output 28 and a neutral point 30 to the respective inverter 22. The DC link 20 comprises two DC link capacitors 31, which are connected in series and are interconnecting the positive DC output 26 with the neutral point 30 and the negative DC output 28 with the neutral point 30, respectively.

Each inverter 22 comprises two half-bridges 32, 34 which are connected in parallel to the DC link 20. Each of the half-bridges 32, 34 comprises two upper semiconductor switches 36 connected in series between the positive DC output 26 and an AC output 38, 40 and two lower semiconductor switches 42 connected in series between the AC output 38, 40 and the negative DC output 26.

The neutral point 30 is connected via diodes 44 to the midpoints between the upper and lower semiconductor switches 36, 42, i.e. the half-bridges 32, 34 and the inverter 22 are neutral point clamped.

The AC outputs 38 of the first (common) half-bridges 32 are star-connected by a common link 46. The AC outputs 40 of the second phase half-bridges 34 are providing the phase outputs 48 of the converter 10.

The semiconductor switches 36, 42 of all converter units 16 are controlled by a controller 50, which may control and regulate the output voltages and/or currents of the converter 10 at the phase outputs 48. The controller also may receive measurement values of currents and/or voltages in the converter 10, in particular the voltages of the DC link capacitors 32.

The converter 10 comprises a neutral point filter 52, which interconnects the neutral points 30 of the converter units 16 in a star-shaped manner. The star-point of the neutral point filter 52 may be earthed. Furthermore, the converter 10 comprises an EMC (electromagnetic compatibility) filter 54, which interconnects the phase outputs 48 of the converter units 16 in a star-shaped manner. The star-point of the EMC filter 54 may be earthed.

The controller 50 is adapted for switching the semiconductor switches 36, 42 of the half-bridges 32, 34 in such a way that the DC link capacitors 31 are discharged via the half-bridges 32, 34 without further need of auxiliary relays, switches or resistors.

Figure 2:
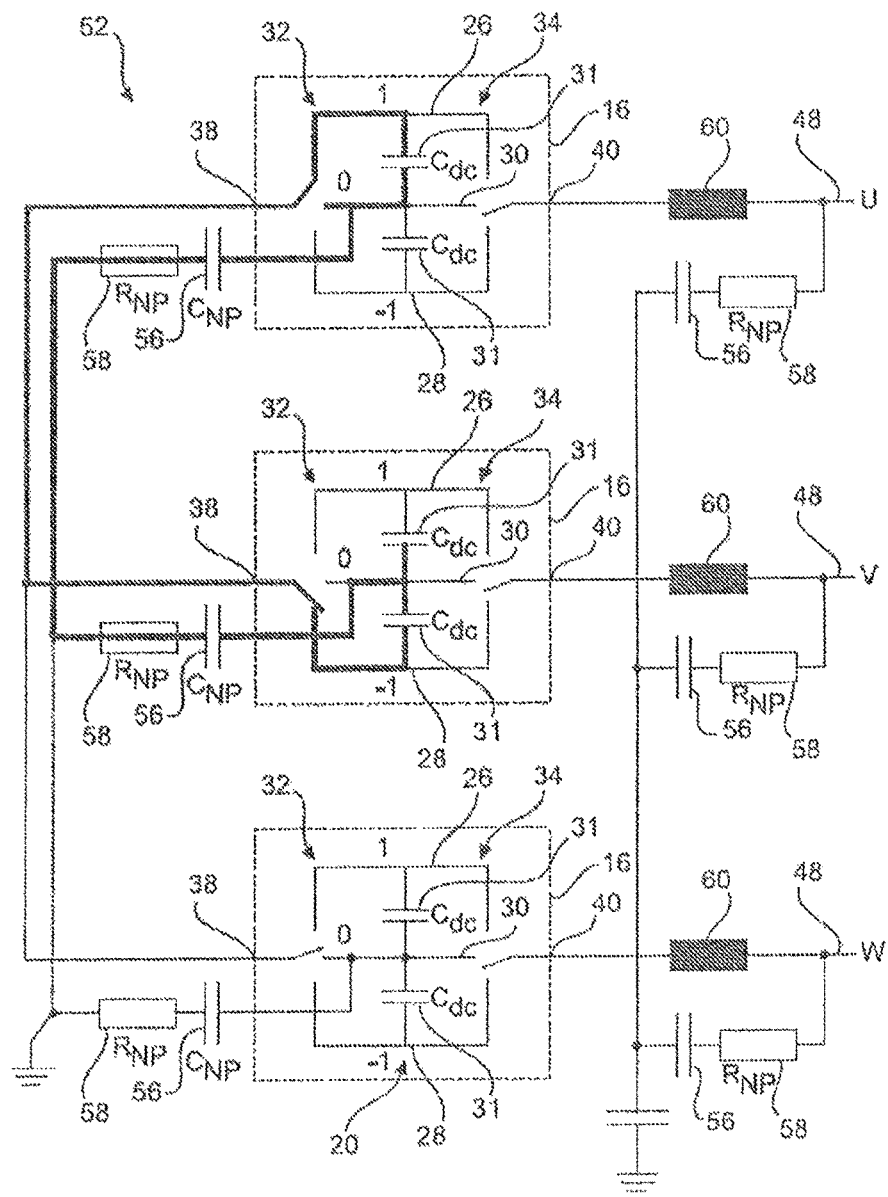
FIG. 2 schematically shows converter units with switching states for a method according to an embodiment of the invention.

FIG. 2 shows a simplified circuit diagram of the converter of FIG. 1. The half-bridges 32, 34 of FIG. 1 have been replaced by switch symbols, which indicate the four possible switching states of a half-bridge 32, 34.

In an opened, disconnected (switching) state, the half-bridge 32, 34 is open and the outputs 26, 28, 30 are disconnected from each other.

In a positive (switching) state, the half-bridge 32, 34 interconnects the positive DC output 26 with the AC output 38, 40.

In a negative (switching) state, the half-bridge 32, 34 interconnects the negative DC output 28 with the AC output 33, 40.

In a neutral (switching) state, the half-bridge 32, 34 interconnects the neutral point 30 with the AC output 38, 40.

Figure 3:
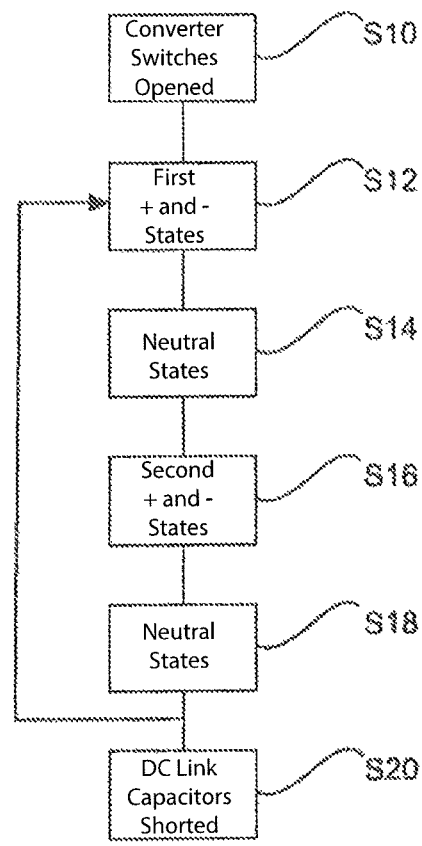
FIG. 3 shows a flow diagram for a method for discharging DC link capacitors according to an embodiment of the invention.

Furthermore, the neutral point filter 52 and the EMC filter 54 are shown in FIG. 3. Each of the filters 52, 54 comprises branches for each phase with a filter capacitor 56 and a filter resistor 58 connected in series. The branches of each filter 52, 54 are star-connected and earthed via the star-point. The EMC filter 54 additionally comprises a filter inductor 60 in the phase output.

FIG. 3 shows a flow diagram for a method that may be performed by the controller 50 for discharging the capacitors 31.

In a first step S10, all half-bridges of the converter 10 may be switched to the opened state. For example, the controller 50 is received a command to shut down the converter 10.

In a second step S12, a first half bridge of a first converter unit is switched to a positive state and a second half bridge of a second converter unit is switched to a negative state.

For example, with respect to FIG. 2, the common half-bridge 32 of the U-phase and the common half-bridge of the V-phase may be correspondingly switched.

FIG. 2 shows the resulting current path 62. In such a way, the upper DC link capacitor 31 of the U-phase converter unit 16 and the DC link capacitor 31 of the V-phase converter unit 16 are interconnected oppositely to each other and discharged via the electrical filter 52 until the filter capacitors 56 and the DC link capacitors 31 are equalized.

In step S14, the first half-bridge and the second half-bridge (for example the common half-bridges 32 of the U-phase and the V-phase) are both switched into the neutral state and the filter capacitors 56 are discharged into the filter resistors 58.

In step S16, a first half bridge is switched to a negative state and the second or a third half bridge is switched to a positive state. For example, in the case of only two phases and two converter units 16, the second half-bridge may be the common half-bridge 32 of the V-phase. However, in the case of three phases as shown in FIG. 2, the U-phase and the W-phase or the V-phase and W-phase may be switched in such a way. This will be explained in more detail with reference to FIG. 4.

In the fourth step, a second DC link capacitor 31 (for example the lower one) of the first converter unit 16 and a second DC link capacitor 31 (for example the upper one) of the second or third converter unit 16 are interconnected oppositely to each other and discharged via the electrical filter 52.

In step S18, the half-bridges are switched back to the neutral state as described with respect to step S14.

Figure 4:
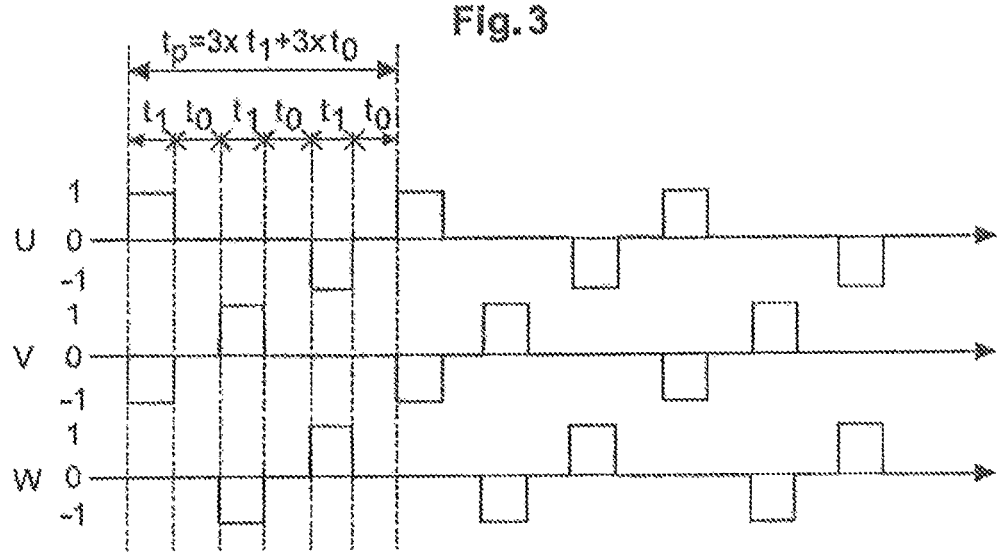
FIG. 4 shows a diagram with a switching scheme for a method according to an embodiment of the invention.

FIG. 4 shows a diagram of the switching states of the common half-bridges 32 of the three phases U, V, W.

Firstly, a first pair of half-bridges 32 (such as the U-phase and the V-phase half-bridge) is (simultaneously) switched to the positive and the negative state. After that, a first pair of half-bridges 32 is (simultaneously) switched back to the neutral state.

Secondly, a second pair of half-bridges 32 (such as the V-phase and the W-phase half-bridge) is switched in such a way.

In a third part of the cycle, the third pair of half-bridges 32 (such as the W-phase and the V-phase half-bridge) is switched in such a way.

In such a cycle, every upper and lower DC link capacitor 31 of each phase U, V, W is discharged. By repeating the cycle, all DC link capacitors 31 may be discharged simultaneously and equally.

The time intervals with positive and negative switched half-bridges 32 may all have the same length $t_1$ and the time intervals with neutral switched half-bridges 32 may all have the length $t_0$ (which may be different from $t_1$). With the parameters $t_1$ and $t_0$, the discharge speed and the load on the filter resistors 58 may be tuned.

Figure 5:
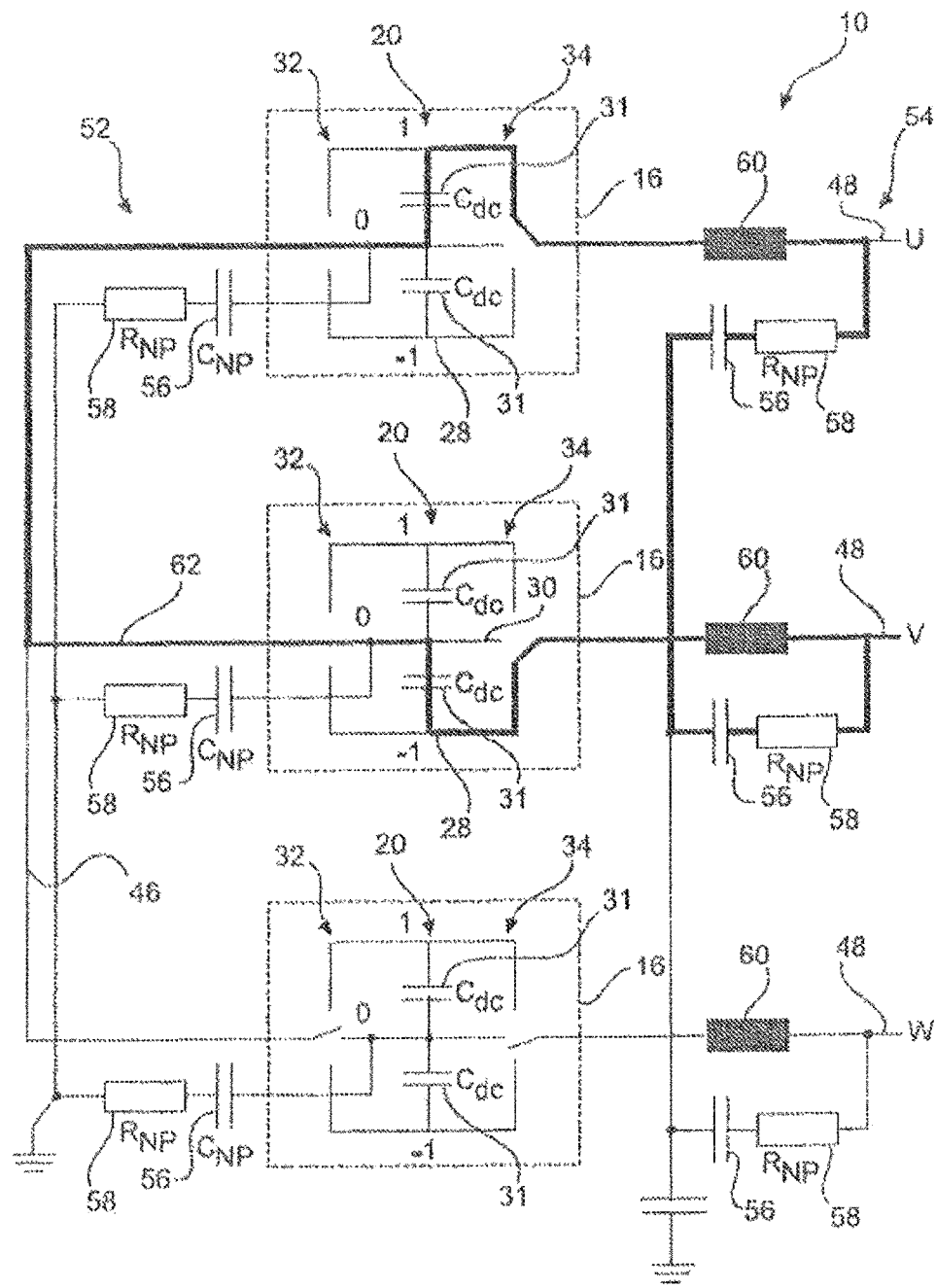
FIG. 5 schematically shows converter units with further switching states for a method according to an embodiment of the invention.

FIG. 5 refers to an alternative method, in which the DC link capacitors 31 are discharged via the EMC filter 54. FIG. 5 shows a current path 62 analogously to FIG. 2 but via the EMC filter 54.

The method of FIG. 3 may be modified in the following way: In step S10, the common half-bridges 32 are all switched to the neutral state, such that the neutral points 30 are interconnected via the common link 46. In the following steps, the phase half-bridges 34 are switched analogously to the common half bridges 32 as explained with respect to FIGS. 2 and 4.

Figure 6:
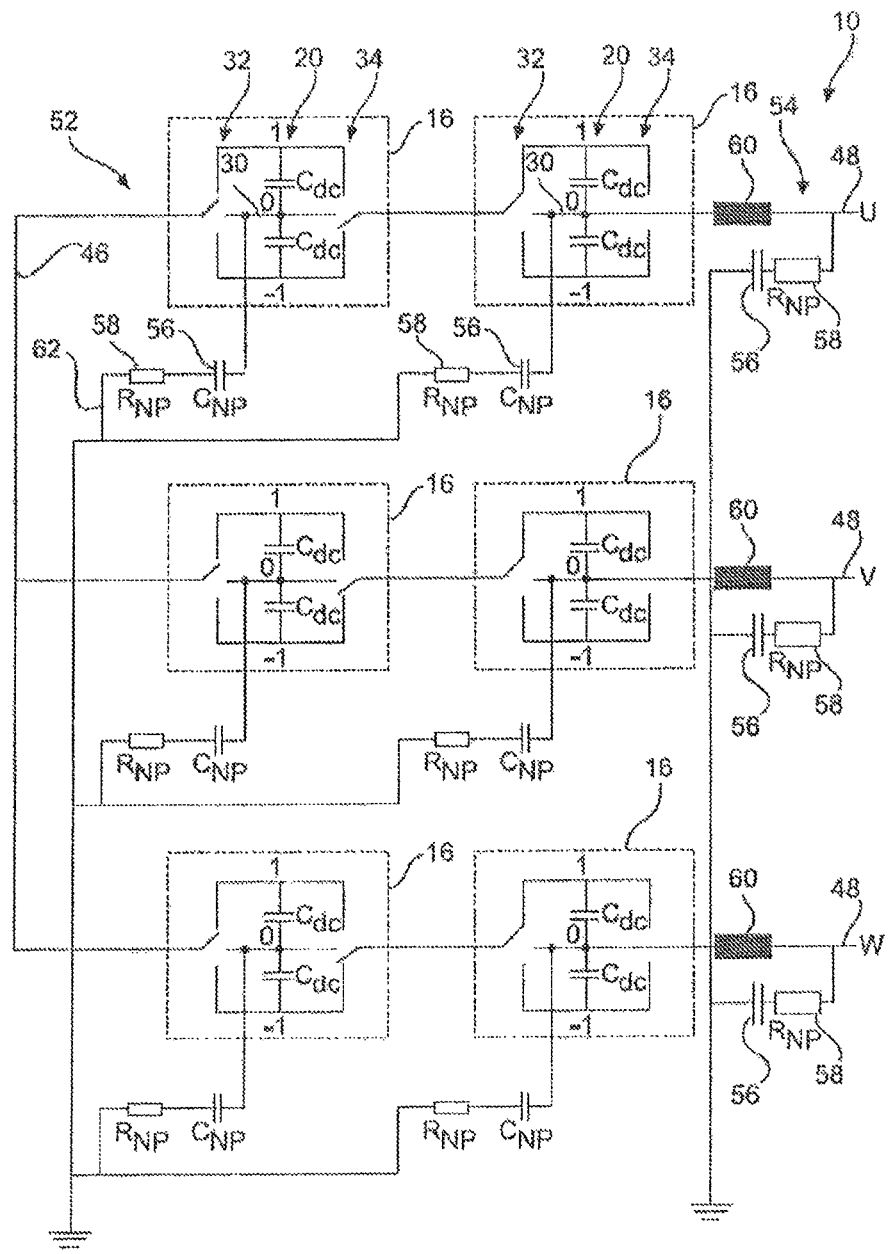
FIG. 6 schematically shows converter units with further switching states for a method according to an embodiment of the invention.

FIG. 6 refers to a further method that may be used for discharging series connected converter modules. As shown in FIG. 6, in each phase, the converter 10 may comprise a basic converter model 16 (which may be connected to the rectifier 18) and an extended converter module 16, which is providing the output phase 48 and which is connected via its common-half-bridge 32 with the phase half-bridge 34 of the basic converter unit 16.

The neutral point filter 52 comprises six branches with series connected resistors 58 and capacitors 56, which are connected with one end to the neutral point 30 and with the other end to a star-point.

For the converter 10 of FIG. 6, the method of FIG. 3 may be modified in that during steps S12 to S18, the phase half-bridge 34 of the basic converter unit 16 and the common half-bridge 32 of the extended converter unit 16 are switched as first and second converter units.

Figure 7:
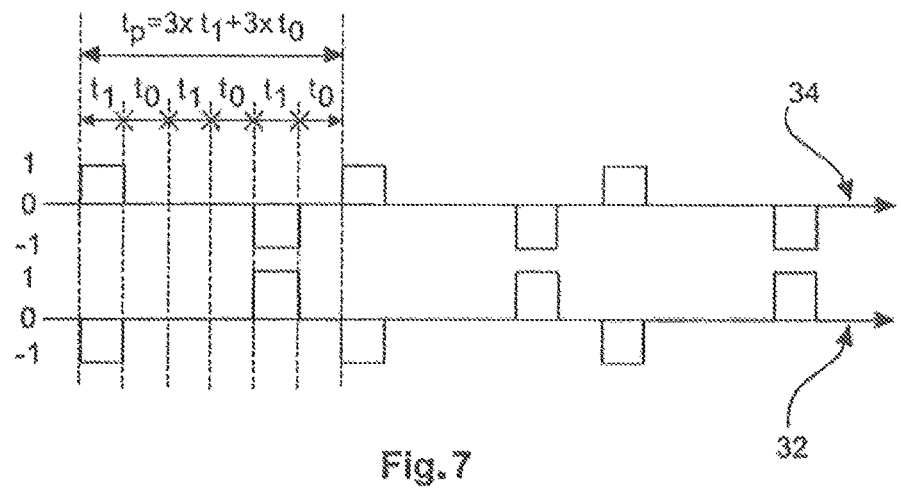
FIG. 7 shows a diagram with a switching scheme for a method according to an embodiment of the invention.

FIG. 7 shows a diagram similar to FIG. 4 of the switching states of the half-bridges 32, 34 of one of the phases of the converter of FIG. 6.

Firstly, the half-bridges 34 of the basic converter unit 16 and the half-bridge 32 of the extended converter unit 16 are (simultaneously) switched to the positive and the negative state. After that, these half-bridges 32, 34 are (simultaneously) switched back to the neutral state.

Secondly, the two half-bridges 32, 34 are switched analogously but with opposite switching states as in the first part of the cycle.

The time intervals $t_1$ and $t_0$ may have the same properties as explained with respect to FIG. 4.

Figure 8:
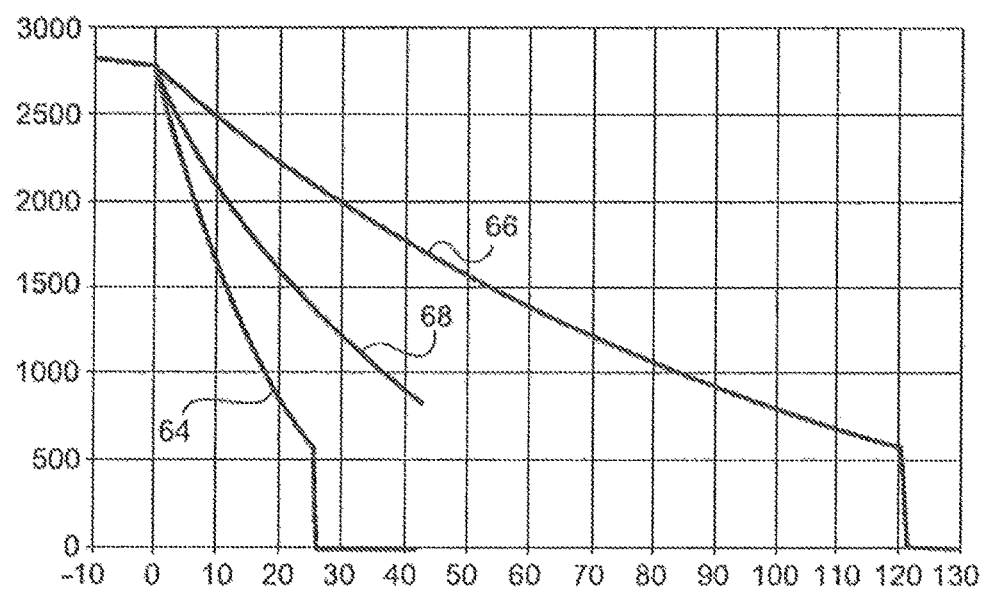
FIG. 8 shows a diagram with DC link voltages produced by a method according to an embodiment of the invention.

FIG. 8 shows a diagram with a measured discharge curve 64 for 3333 Hz, a measured discharge curve for 667 Hz and a calculated theoretical discharge curve for 3333 Hz. It can be seen, that the measured discharge is significantly faster than the calculated. However, the measured neutral point filter current matches the expected value. This may mean that additional losses are dissipated within the converter units 16, most likely in the semiconductors.

The measurements show that the discharge time is indirect proportional to the frequency.

As also indicated in FIG. 3, the alternate switching may be repeated until the voltage of the DC link capacitors reaches a predefined value. With respect to FIG. 3, when the predefined value has been reached, in step S20, the DC link capacitors 31 may be short-circuited for discharging them completely.

For example, at about 560 V, the controller 50 may make the short circuit. The predefined value may be set to a level that does not apply significant stress to any component. It also shortens the time to total discharge (which may be reached for voltages lower than 50 V) drastically.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere tact that certain measures are recited in mutually different dependent claims does not indicate that a combination of these measures cannot be used to advantage. Any reference signs in the claims should not be construed as limiting the scope.

LIST OF REFERENCE SYMBOLS 10 converter
12 grid
14 machine
16 converter unit
18 rectifier
20 DC link
22 inverter
24 transformer
26 positive DC output
28 negative DC output
30 neutral point
31 DC link capacitors
32 common half-bridge
34 phase half-bridge
36 upper semiconductor switches
38 first AC output
40 second AC output
42 lower semiconductor switches
44 diode
46 common link
48 phase outputs
50 controller
52 neutral point filler
54 EMC lifter
56 filter capacitor
58 filter resistor
60 filler inductor
62 current path
64, 66, 68 discharge curves

The invention claimed is:

1. A method for discharging DC link capacitors of an electrical converter,
wherein the converter comprises at least two converter units, each converter unit comprising a neutral point clamped half-bridge with a neutral point, an AC output, a positive DC output and a negative DC output and each converter unit comprising a DC link with two DC link capacitors, which are interconnecting the positive DC output and the negative DC output with the neutral point;
wherein the half-bridges are adapted to be switched to a positive state, in which its AC output is connected with its positive DC output, to a negative state, in which its AC output is connected with its negative DC output and to a neutral state, in which their AC output is connected with the neutral point;
wherein the half-bridges of the converter units are interconnected via its neutral points via a first connection and via its AC outputs via a second connection and at least one of the first connection and the second connection comprises an electrical filter with a filter resistor and a filter capacitor connected in series;
the method comprising:
switching a first half bridge of a first converter unit of the at least two converter units to a the positive state, in which its AC output is connected with its positive DC output,
simultaneously switching a second half bridge of a second converter unit of the at least two converter units to a negative state, in which its AC output is connected with its negative DC output, such that a DC link capacitor of the first converter unit and a DC link capacitor of the second converter unit are interconnected oppositely to each other and are discharged via the electrical filter, wherein the two half-bridges, which are interconnected via a direct connection and a connection via the electrical filter are switched, such that a current loop is generated that discharges the DC link capacitors via the electrical filter and the filter resistor of the electrical filter is used for dissipating electrical energy;
switching the first half-bridge and the second half-bridge simultaneously into a neutral state, in which their AC output is connected with the neutral point, such that the filter capacitor, which was charged by the DC link capacitors, while the first and second half-bridges were in the positive and negative state, discharges the DC link capacitors;
repeating an alternating switching of the half-bridges for discharging DC link capacitors until the voltage of the DC link capacitors reaches a predefined value.

2. The method of claim 1, further comprising:
short circuiting the DC link capacitors, when the voltage has reached the predefined value.

3. The method of claim 2,
wherein each of the converter units comprises a common half-bridge and a phase half-bridge connected in parallel to the DC link;
wherein the converter units are connected in parallel and provide different phases of the electrical converter;
wherein the converter units are star-connected via a common connection interconnecting the AC outputs of the common half-bridges.

4. The method of claim 2,
wherein three converter units are connected in parallel for providing three phase outputs of the electrical converter;
the method comprising:
simultaneously switching a first half-bridge of a first converter unit to the positive state and a second half-bridge of a second converter unit to the negative state;
simultaneously switching the second half-bridge to the positive state and a third half-bridge of a third converter unit to the negative state;
simultaneously switching the first half-bridge to the negative state and the third half-bridge to the positive state.

5. The method of claim 1,
wherein each of the converter units comprises a common half-bridge and a phase half-bridge connected in parallel to the DC link;

wherein the converter units are connected in parallel and provide different phases of the electrical converter;
wherein the converter units are star-connected via a common connection interconnecting the AC outputs of the common half-bridges.

6. The method of claim 5,
wherein the converter units are star-connected via a neutral point filter connected to the neutral points of the converter units;
wherein the DC link capacitors are discharged via the neutral point filter.

7. The method of claim 6,
wherein the DC link capacitors are discharged by switching the common half-bridges of the converter units;
wherein the phase half-bridges are in an opened state, in which the respective phase output of the converter unit is disconnected from the phase half-bridge.

8. The method of claim 6,
wherein the converter units are star-connected via an EMC filter connected to phase outputs of the converter unit;
wherein the DC link capacitors are discharged via the EMC filter.

9. The method of claim 5,
wherein the converter units are star-connected via an EMC filter connected to phase outputs of the converter units;
wherein the DC link capacitors are discharged via the EMC filter.

10. The method of claim 1,
wherein three converter units are connected in parallel for providing three phase outputs of the electrical converter;
the method comprising:
simultaneously switching a first half-bridge of a first converter unit to the positive state and a second half-bridge of a second converter unit to the negative state;
simultaneously switching the second half-bridge to the positive state and a third half-bridge of a third converter unit to the negative state;
simultaneously switching the first half-bridge to the negative state and the third half-bridge to the positive state.

11. The method of claim 10, further comprising:
simultaneously switching the half-bridges to the neutral state every time after switching the half-bridges to a positive state or a negative state.

12. The method of claim 1,
wherein each of the half-bridges comprises two upper semiconductor switches connecting the positive DC output with the AC output, two lower semiconductor switches connecting the AC output with the negative DC output and two diodes interconnecting the neutral point with midpoints between the two upper semiconductor switches and two lower semiconductor switches.

13. The method of claim 1,
wherein the converter is an AC-AC converter and a converter unit furthermore comprises a rectifier for providing its DC link with a DC voltage.

14. The method of claim 13,
wherein the converter comprises a transformer with multiple secondary windings which are interconnected with the rectifiers of the converter units.

15. The method of claim 1, further comprising:
switching the first half bridges to a negative state and simultaneously switching the second half bridge or a third half bridge to a positive state, such that a second DC link capacitor of the first half-bridge and a second DC link capacitor of the second or third half-bridge are interconnected oppositely to each other and discharged via the electrical filter.

16. The method of claim 15, further comprising:
short circuiting the DC link capacitors, when the voltage has reached the predefined value.

17. The method of claim 15,
wherein each of the converter units comprises a common half-bridge and a phase half-bridge connected in parallel to the DC link;
wherein the converter units are connected in parallel and provide different phases of the electrical converter;
wherein the converter units are star-connected via a common connection interconnecting the AC outputs of the common half-bridges.

18. The method of claim 15,
wherein three converter units are connected in parallel for providing three phase outputs of the electrical converter;
the method comprising:
simultaneously switching a first half-bridge of a first converter unit to the positive state and a second half-bridge of a second converter unit to the negative state;
simultaneously switching the second half-bridge to the positive state and a third half-bridge of a third converter unit to the negative state;
simultaneously switching the first half-bridge to the negative state and the third half-bridge to the positive state.

19. A controller for an electrical converter adapted for performing the steps of the method of claim 1.

20. The method of claim 1,
wherein a first converter unit and a second converter unit are connected in series such that a phase half-bridge of the first converter unit is connected via its AC output with the AC output of a common half-bridge of the second converter unit;
wherein the neutral point of the first converter unit and the neutral point of the second converter unit are interconnected via a neutral point filter;
the method comprising:
simultaneously switching the phase half-bridge of the first converter unit to the positive state and the common half-bridge of the second converter unit to the negative state;
simultaneously switching the phase half-bridge of the first converter unit to the negative state and the common half-bridge of the second converter unit to the positive state.

* * * * *